Oct. 31, 1939.　　　T. N. PIERSON　　　2,178,023
REEL SUPPORT FOR HARVESTING MACHINES
Filed Aug. 19, 1937

INVENTOR
Torvald N. Pierson.
BY
Arthur C. Brown
ATTORNEY

Patented Oct. 31, 1939

2,178,023

UNITED STATES PATENT OFFICE 2,178,023

REEL SUPPORT FOR HARVESTING MACHINES

Torvald N. Pierson, Independence, Mo., assignor to Gleaner Harvester Corporation, Independence, Mo., a corporation of Delaware Application August 19, 1937, Serial No. 159,920

6 Claims. (Cl. 56—221)

This invention relates to a reel support for harvesting machines, particularly those known as combines, and has for its principal object to provide a rigid, light weight reel support that is especially adapted to small harvesters wherein weight and rigidity of construction, as well as economy, are important factors.

Other important objects of the invention are to provide a reel support wherewith the reel is readily adjusted according to the character of the crop being harvested; and to provide a support wherein the reel is effectively supported entirely at one end thereof.

In accomplishing these and other objects of the invention, as hereinafter pointed out, I have provided improved details of structure, the preferred form of which is illustrated in the accompanying drawing, wherein.

Figure 1:
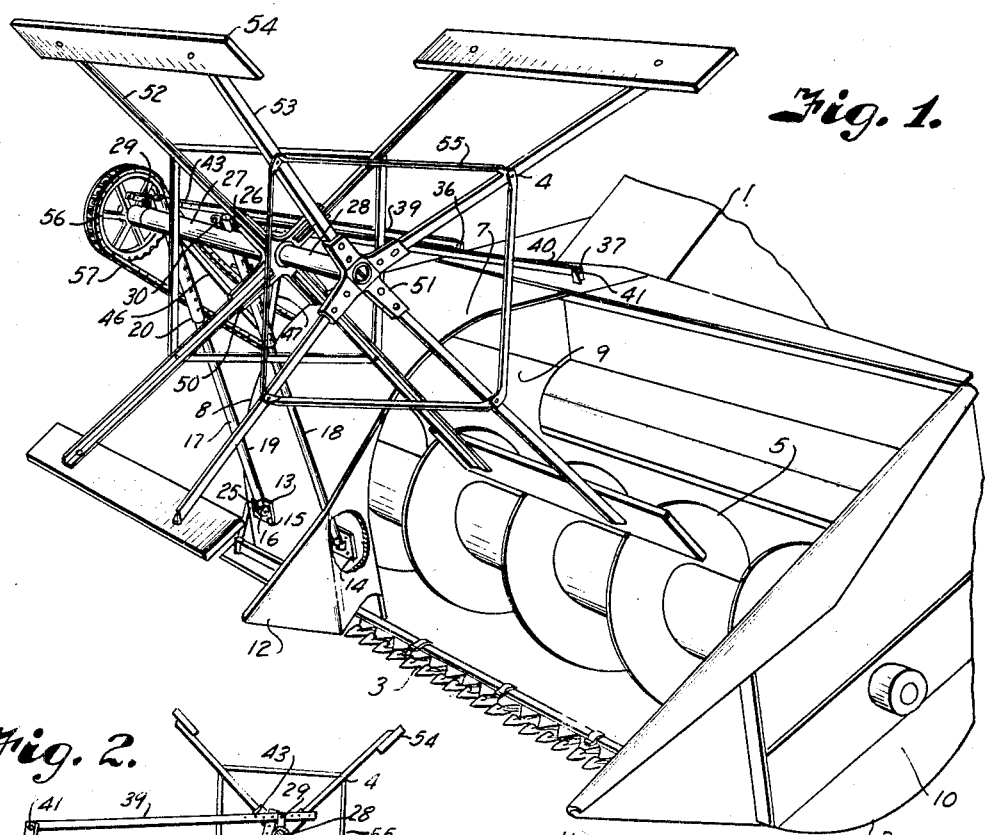
Fig. 1 is a perspective view of the harvester unit of a combine equipped with a reel support embodying the features of the present invention.

Referring more in detail to the drawing:

1 designates the harvester unit of a combine or similar machine and includes a grain pan 2, a sickle 3 attached to the forward edge of the pan, a reel 4 for bringing the grain or other material to be harvested into engagement with the sickle, and a conveyor 5 for delivering the cut grain into the threshing unit 6 of the machine.

The delivery end of the conveyor pan 2 is enclosed by an arcuate cover 7 and an end wall 8 to form a feed chamber wherefrom the grain is fed through an opening 9 in the rear wall of the pan into the threshing cylinder. The opposite end of the pan is closed by a wall 10, carrying a forwardly projecting grain divider 11 that cooperates with a similar divider 12 at the side of the cover 7 to guidingly support the grain or swath while it is being moved by the reel into cutting contact with the sickle.

The construction thus far described may be of any conventional type as it specifically forms no part of the present invention, with the exception that the cover 7 and a portion of the frame of the grain pan are utilized for carrying the reel support, as now to be described.

Fixed to the lower portion of the cover plate 7 are spaced brackets 13 and 14, each comprising an attaching plate 15 having spaced ears 16 for pivotally connecting spaced, telescoping, post-like supports 17 and 18. The posts 17 and 18 are preferably formed of telescoping sections 19 and 20, of tubular material of such diameter that the sections 20 are snugly slidable over the sections 19. The sections are provided with a series of apertures 21 and 22 respectively, wherethrough fastening devices, such as cotter pins 23, are extended through selected apertures to retain the sections in adjusted position. The lower sections 17 have apertured ears 24 that engage between the ears on the brackets 14 and 15, and are pivoted thereto by pivot pins or bolts 25, so that the supports are adapted to pivot to and from the cover 7 incidental to adjustment of the reel as later described.

Welded or otherwise secured to the upper sections 20, as indicated at 26, is a horizontally positioned tube 27 forming a tubular bearing for the shaft 28 of the reel 4, later described, the tube being of adequate length to support the reel in overhanging relation to the sickle so that no other support is required. Fixed to the bearing tube 27, at points adjacent the posts, are yoke-shaped brackets 29 and 30, having bar portions 31 welded to the tube and having arms 32 and 33 provided with apertures 34 and 35. Fixed to the upward extensions 36 and 37 of the harvester pan frame, on the respective sides of the opening 9, are brace bars 39 and 40, pivotally connected with the frame extensions by fastening devices, such as bolts 41 extending through the flanges thereof. The opposite ends of the brace bars pass between the arms of the U-shaped brackets 29 and 30, and the flanges thereof have a series of apertures 42 and 43 through which fastening devices, such as cotter pins 44 and 45, are extended to retain the post in functional position. The bars 39 and 40 are preferably interconnected by cross braces 38 to enhance the rigidity thereof.

Figures 2, 3:
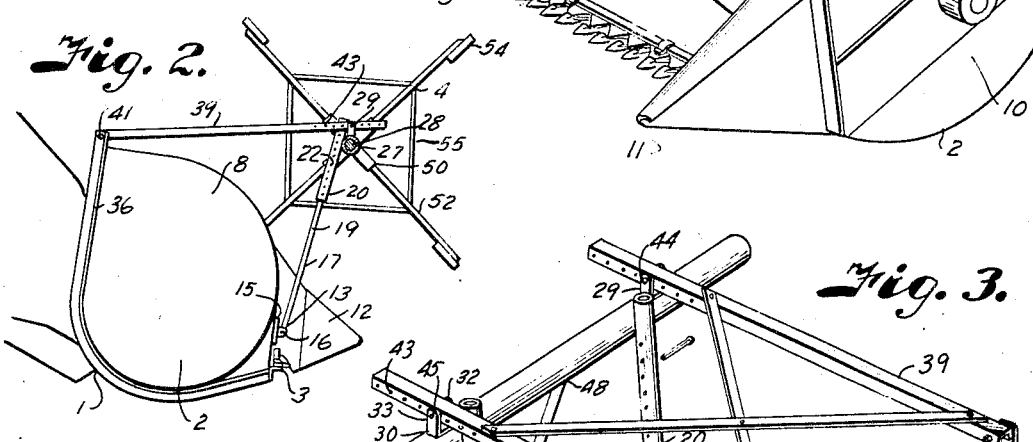
Fig. 2 is a side elevational view of the harvester unit with the reel shaft and its bearing sleeve shown in section.
Fig. 3 is a disassembled perspective view of the reel support.
Figure 4:
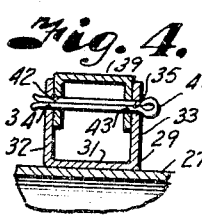
Fig. 4 is a detail section through one of the brace arm brackets of the support.
Figure 5:
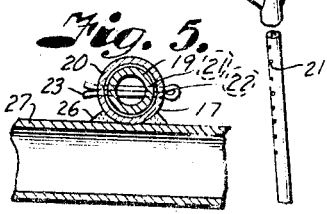
Fig. 5 is a detail section through one of the supporting posts and reel shaft bearing.

In order to increase the rigidity of the bearing tube, it is provided with braces 46 and 47 having their upper ends welded to the tube, as at 48, and to the lower ends of the upper section of the supporting post 18, as best shown in Fig. 3.

The reel 4 includes a shaft 28 of suitable diameter to freely rotate within the inner diameter of the bearing tube 27, and carries spiders 50 and 51 having sets of radially extending arms 52 and 53 to mount the cross bars 54 of the reel, the arms being radially braced by connecting bars 55, 55 as in conventional practice. The arms for the spider 50 extend substantially in the plane thereof, but the arms for the other spider diverge outwardly in the direction of the outer end of the sickle to better support cross bars having a length corresponding to the length of the sickle. The opposite end of the shaft projects from the bearing tube and carries a sprocket wheel 56 by which the reel is rotated through a flexible driving connection, such as a chain 57, driven from any suitable operating shaft on the machine. The spider 50 and hub of the sprocket wheel preferably engage the ends of the bearing tube so as to prevent lateral shifting of the reel.

In adjusting a reel constructed and assembled as described, for example, to raise the cross bars 54 thereof relatively to the sickle, the cotter pins 22 are removed and the upper sections of the supporting post, carrying the bearing tube and reel, are raised to the desired height, whereupon the cotter pins are reinserted through any one of the registering apertures in the respective post sections. The reel is then adjusted forwardly of the sickle by removing the cotter pins 44 and 45 and swinging the entire reel on the pivot connections of the brackets 13 and 14, whereupon the cotter pins are reinserted through the brackets 32 and 33 and through the closest apertures in the brace bars.

From the foregoing it is obvious that I have provided a reel mounting which is of rigid, light weight construction, and therefore especially adapted to small harvesters wherein weight and rigidity of construction, as well as economy, are important factors, both in the successful manufacture and use of the machine. It is also obvious that the reel is readily positioned to give the desired sweep across the sickle according to the character of the crop being harvested, that is, it may be set forwardly of and at any desired elevation above the sickle to provide the best operating conditions.

What I claim and desire to secure by Letters Patent is:

1. In a harvester having a grain pan and an arcuate cover at one end of the grain pan, a reel support including a shaft, a bearing tube rotatably mounting one end of the shaft, spaced supports connected with the ends of the bearing, means pivotally connecting the supports with the cover for movement on a fixed axis, and brace means connected with the supports and with the cover for retaining the supports in a selected pivotal position.

2. In a harvester including a grain pan, a cover at one end of the grain pan, a reel, means supporting the reel including a shaft, a bearing rotatably mounting one end of the shaft, telescoping bearing supports adapted for carrying the shaft at selected elevations, means pivoting the bearing supports to the cover for movement on a fixed axis, and brace means retaining the bearing supports in a selected pivotal position relative to said cover.

3. In a harvester, a reel, a shaft connected with the reel, a bearing tube rotatably mounting the shaft, tubular supporting sections fixed to the bearing tube and having a plurality of openings, rod sections slidable in the tubular sections and having openings adapted to selectively register with the openings in the tubular sections, fastening devices extending through selected openings, means pivotally connecting the rod sections on the harvester, brackets fixed to the bearing tube, brace arms having a series of openings extending therethrough, fastening devices extending through selected openings for connecting the brace arms with the bearing tube, and means pivotally connecting the brace arms with the harvester.

4. In a harvester having a grain pan and a feed chamber at one end of the pan, a reel support including spaced posts, means pivotally supporting the lower ends of the posts on a portion of the feed chamber at the front of the pan, a shaft bearing member carried by the upper ends of the posts, a reel shaft rotatably mounted in said bearing member, brace arms pivotally connected with an upper portion of the feed chamber, and means adjustably connecting said brace arms relatively with the upper ends of the posts for selectively varying position of a reel carried by said shaft.

5. In a harvester having a grain pan and a cover at one end of the pan, brackets having fixed relation with the lower portion of said cover, posts having lower ends pivotally connected with said brackets, a tube connecting upper ends of the posts, brackets fixed to the tube, brace arms having rear ends fixed relatively to an upper portion of said cover and having forward ends adjustably connected with said tube brackets, and a reel shaft rotatable in the tube.

6. In a harvester having a grain pan and a feed chamber at one end of the pan, a reel support including a tube, spaced tubular members fixed to the tube, yoke-shaped brackets fixed to the tube, brace arms adjustably connected with said yoke-shaped brackets, means pivotally connecting the brace arms to an upper portion of the feed chamber to form a vertically adjustable unit arranged to swing on said pivotal connecting means, spaced rods having slidable engagement in said tubular members, means pivotally connecting the lower ends of the spaced rods to a lower portion of the feed chamber, and means securing said tubular members to the rods for anchoring said unit in a vertically adjusted position.

TORVALD N. PIERSON.